United States Patent
Lu et al.

(10) Patent No.: US 9,567,231 B2
(45) Date of Patent: *Feb. 14, 2017

(54) SYSTEM AND METHOD FOR LARGE SCALE SYNTHESIS OF METAL CYANOMETALLATES

(71) Applicant: Sharp Laboratories of America, Inc., Camas, WA (US)

(72) Inventors: Yuhao Lu, Camas, WA (US); Wei Pan, Vancouver, WA (US); Sean Vail, Vancouver, WA (US); Jong-Jan Lee, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/230,395

(22) Filed: Aug. 6, 2016

(65) Prior Publication Data

US 2016/0340200 A1 Nov. 24, 2016

Related U.S. Application Data

(63) Continuation-in-part of application No. 14/928,559, filed on Oct. 30, 2015, which is a continuation-in-part (Continued)

(51) Int. Cl.
*H01M 4/56* (2006.01)
*C01C 3/11* (2006.01)
(Continued)

(52) U.S. Cl.
CPC .............. *C01C 3/11* (2013.01); *B01J 19/1862* (2013.01); *B01J 19/2445* (2013.01); *H01M 4/58* (2013.01);
(Continued)

(58) Field of Classification Search
CPC ..... C01C 3/11; H01M 10/0585; H01M 4/623; H01M 2/1626; H01M 2/1625; H01M 10/054; H01M 4/387; H01M 4/56; Y02E 60/122

See application file for complete search history.

(56) References Cited

U.S. PATENT DOCUMENTS

2012/0328936 A1* 12/2012 Wessells ............. H01M 10/054
429/188

OTHER PUBLICATIONS

V.D. Neff, Some performance characteristics of a Prussian Blue battery, Journal of Electrochemical Society, 132 (1985) 1382-1384.
(Continued)

*Primary Examiner* — Emily Le
*Assistant Examiner* — Monique Wills
(74) *Attorney, Agent, or Firm* — Law Office of Gerald Maliszewski; Gerald Maliszewski (57) ABSTRACT

A system and method are presented for the large scale synthesis of metal cyanometallates (MCMs). First and second precursor solutions are added to a main reactor, where the first precursor includes M1 metal cations. The second precursor solution includes $A_X M2(CN)_Z$, where M1 and M2 are from a first group of metals and A is from a second group of metals including alkali or alkaline earth metals. In response to stirring the first and second precursors, MCM particles are formed with the formula $A_X M1_N M2_M (CN)_Z \cdot d[H_2O]_{ZEO} \cdot e[H_2O]_{BND}$, in solution. In response to aging in the secondary reactor, the size of the MCM particles is increases. The aged MCM particles in solution are then transferred to a separation tank, where the aged MCM particles are filtered from the solution and collected. The solution reclaimed from the separation tank back is added back into the main reactor.

20 Claims, 6 Drawing Sheets

Related U.S. Application Data of application No. 14/827,001, filed on Aug. 14, 2015, now Pat. No. 9,455,446, and a continuation-in-part of application No. 14/830,838, filed on Aug. 20, 2015, now Pat. No. 9,478,798, which is a continuation-in-part of application No. 14/795,834, filed on Jul. 9, 2015, now Pat. No. 9,431,655, which is a continuation-in-part of application No. 14/668,788, filed on Mar. 25, 2015, now Pat. No. 9,531,002, which is a continuation-in-part of application No. 14/472,228, filed on Aug. 28, 2014, now Pat. No. 9,546,097, which is a continuation-in-part of application No. 14/340,141, filed on Jul. 24, 2014, which is a continuation-in-part of application No. 14/320,352, filed on Jun. 30, 2014, which is a continuation-in-part of application No. 14/271,498, filed on May 7, 2014, now Pat. No. 9,419,278, which is a continuation-in-part of application No. 14/230,882, filed on Mar. 31, 2014, which is a continuation-in-part of application No. 14/198,755, filed on Mar. 6, 2014, which is a continuation-in-part of application No. 14/198,702, filed on Mar. 6, 2014, which is a continuation-in-part of application No. 14/198,663, filed on Mar. 6, 2014, now Pat. No. 9,537,131, which is a continuation-in-part of application No. 14/193,782, filed on Feb. 28, 2014, which is a continuation-in-part of application No. 14/193,501, filed on Feb. 28, 2014, now Pat. No. 9,406,919, which is a continuation-in-part of application No. 14/174,171, filed on Feb. 6, 2014, now Pat. No. 9,455,431, which is a continuation-in-part of application No. 14/067,038, filed on Oct. 30, 2013, now Pat. No. 9,450,224, which is a continuation-in-part of application No. 14/059,599, filed on Oct. 22, 2013, now Pat. No. 9,083,041, which is a continuation-in-part of application No. 13/907,892, filed on Jun. 1, 2013, now Pat. No. 8,968,925, which is a continuation-in-part of application No. 13/897,492, filed on May 20, 2013, now Pat. No. 9,099,719, which is a continuation-in-part of application No. 13/872,673, filed on Apr. 29, 2013, now Pat. No. 9,246,164, which is a continuation-in-part of application No. 13/752,930, filed on Jan. 29, 2013, now Pat. No. 9,099,718, which is a continuation-in-part of application No. 13/603,322, filed on Sep. 4, 2012, now Pat. No. 9,159,502, and a continuation-in-part of application No. 13/523,694, filed on Jun. 14, 2012, now Pat. No. 8,956,760, which is a continuation-in-part of application No. 13/449,195, filed on Apr. 17, 2012, which is a continuation-in-part of application No. 13/432,993, filed on Mar. 28, 2012, now Pat. No. 9,269,953.

(51) Int. Cl.
| | | |
|---|---|---|
| *B01J 19/18* | (2006.01) | |
| *B01J 19/24* | (2006.01) | |
| *H01M 4/58* | (2010.01) | |
| *H01M 10/0525* | (2010.01) | |
| *H01M 10/054* | (2010.01) | |

(52) U.S. Cl.
 CPC ....... *H01M 10/054* (2013.01); *H01M 10/0525* (2013.01); *B01J 2219/00051* (2013.01); *B01J 2219/24* (2013.01); *C01P 2006/40* (2013.01)

(56) References Cited

OTHER PUBLICATIONS

N. Imanishi et al., Lithium intercalation behavior into iron cyanide complex as positive electrode of lithium secondary battery, Journal of Power Sources, 79 (1999) 215-219.

Y. Lu, L. Wang, J. Cheng, J.B. Goodenough, Prussian blue: a new framework for sodium batteries, Chemistry Communication, 48 (2012) 6544-6546.

L. Wang, Y. Lu, J. Liu, M. Xu, J. Cheng, D. zhang, J.B. Goodenough, A superior low-cost cathode for a Na-ion battery, Angew. Chem. Int. Ed., 52(2013)1964-1967.

A. Eftekhari, Potassium secondary cell based on Prussian blue cathode, J.Power Sources, 126 (2004) 221-228.

C.D. Wessells, R.A. Huggins, Y. Cui, Copper hexacyanoferrate battery electrodes with long cycle life and high power, Nature Communication, 2( 2011) 550.

C.D. Wessells et al., Nickel hexacyanoferrate nanoparticle electrodes for aqueous sodium and potassium ion batteries. Nano Letter, 11(2011) 5421-5425.

C.D. Wessells et al., The effect of insertion species on nanostructured open framework hexacyanoferrate battery electrode, J. Electrochem. Soc., 159(2012) A98-A103.

T.Matsuda, M. Takachi, Y. Moritomo, A sodium manganese ferrocyanide thin film for Na-ion batteries, Chemical Communications, DOI: 10.1039/C3CC38839E.

S.-H. Yu et al., Iron hexacyanoferrate nanoparticles as cathode materials for lithium and sodium rechargeable batteries, ECS Electrochemistry Letters, 2(2013)A39-A41.

X. Wu et al., Single-crystal FeFe(CN)6 nanoparticles: a high capacity and high rate cathode for Na-ion batteries, J. Mater. Chem. A., 1(2013) 10130-10134.

Y.-G. Guo et al., High-quality Prussian blue crystals as superior cathode materials . . . , Energy & Environmental Science, (2014) DOI: 10.1039/C3EE44004D.

\* cited by examiner

SYSTEM AND METHOD FOR LARGE SCALE SYNTHESIS OF METAL CYANOMETALLATES

RELATED APPLICATIONS

This application incorporates the following applications by reference:

ALKALI-ION BATTERY WITH ENHANCED TRANSITION METAL CYANOMETALLATE ELECTRODE STRUCTURE, invented by Jie Song et al., Ser. No. 14/928,559, filed Oct. 30, 2015;

PRUSSIAN BLUE ANALOGUE ELECTRODES WITHOUT ZEOLITIC WATER CONTENT, invented by Yuhao Lu et al., Ser. No. 14/830,838, filed Aug. 20, 2015;

SODIUM AND POTASSIUM ION BATTERIES WITH HALOGEN SALTS, invented by Yuhao Lu et al., Ser. No. 14/827,001, filed Aug. 14, 2015:

ANTIMONY AND LAYERED CARBON NETWORK BATTERY ANODE, invented by Xin Zhao et al, Ser. No. 14/795,834, filed Jul. 9, 2015;

TRANSITION METAL CYANOMETALLATE CATHODE BATTERY WITH METAL PLATING ANODE, invented by Yuhao Lu et al, Ser. No. 14/668,788, filed Mar. 25, 2015;

METHOD FOR THE SYNTHESIS OF IRON HEXACYANOFERRATE, invented by Sean Vail et al, Ser. No. 14/472,228, filed Aug. 28, 2014;

TRANSITION METAL HEXACYANOMETALLATE ELECTRODE WITH WATER-SOLUBLE BINDER, invented by Long Wang et al, Ser. No. 14/340,141, filed Jul. 24, 2014;

ELECTROLYTE ADDITIVES FOR TRANSITION METAL CYANOMETALLATE ELECTRODE STABILIZATION, invented by Yuhao Lu et al, Ser. No. 14/320,352, filed Jun. 30, 2014;

RECHARGEABLE METAL-ION BATTERY WITH NON-AQUEOUS HYBRID ION ELECTROLYTE, invented by Long Wang et al, Ser. No. 14/271,498, filed May 7, 2014;

REACTIVE SEPARATOR FOR A METAL-ION BATTERY, invented by Long Wang et al, Ser. No. 14/230,882, filed Mar. 31, 2014;

NASICON-POLYMER ELECTROLYTE STRUCTURE, invented by Long Wang et al, Ser. No. 14/198,755, filed Mar. 6, 2014;

BATTERY WITH AN ANODE PRELOADED WITH CONSUMABLE METALS, invented by Yuhao Lu et al, Ser. No. 14/198,702, filed Mar. 6, 2014;

BATTERY ANODE WITH PRELOADED METALS, invented by Long Wang et al, Ser. No. 14/198,663, filed Mar. 6, 2014;

METAL BATTERY ELECTRODE WITH PYROLYZED COATING, invented by Yuhao Lu et al, Ser. No. 14/193,782, filed Feb. 28, 2014;

METAL HEXACYANOMETALLATE ELECTRODE WITH SHIELD STRUCTURE, invented by Yuhao Lu et al, Ser. No. 14/193,501, filed Feb. 28, 2014;

CYANOMETALLATE CATHODE BATTERY AND METHOD FOR FABRICATION, invented by Yuhao Lu et al, Ser. No. 14/174,171, filed Feb. 6, 2014;

SODIUM IRON(II)-HEXACYANOFERRATE(II) BATTERY ELECTRODE AND SYNTHESIS METHOD, invented by Yuhao Lu et al, Ser. No. 14/067,038, filed Oct. 30, 2013;

TRANSITION METAL HEXACYANOMETALLATE-CONDUCTIVE POLYMER COMPOSITE, invented by Sean Vail et al., Ser. No. 14/059,599, filed Oct. 22, 2013, now U.S. Pat. No. 9,083,041, issued on Jul. 14, 2015;

METAL-DOPED TRANSITION METAL HEXACYANOFERRATE (TMHCF) BATTERY ELECTRODE, invented by Yuhao Lu et al., Ser. No. 13/907,892, filed Jun. 1, 2013, now U.S. Pat. No. 8,968,925, issued on Mar. 3, 2015;

HEXACYANOFERRATE BATTERY ELECTRODE MODIFIED WITH FERROCYANIDES OR FERRICYANIDES, invented by Yuhao Lu et al., Ser. No. 13/897,492, filed May 20, 2013;

PROTECTED TRANSITION METAL HEXACYANOFERRATE BATTERY ELECTRODE, invented by Yuhao Lu et al., Ser. No. 13/872,673, filed Apr. 29, 2013;

TRANSITION METAL HEXACYANOFERRATE BATTERY CATHODE WITH SINGLE PLATEAU CHARGE/DISCHARGE CURVE, invented by Yuhao Lu et al., Ser. No. 13/752,930, filed Jan. 29, 2013;

SUPERCAPACITOR WITH HEXACYANOMETALLATE CATHODE, ACTIVATED CARBON ANODE, AND AQUEOUS ELECTROLYTE, invented by Yuhao Lu et al., Ser. No. 13/603,322, filed Sep. 4, 2012;

IMPROVEMENT OF ELECTRON TRANSPORT IN HEXACYANOMETALLATE ELECTRODE FOR ELECTROCHEMICAL APPLICATIONS, invented by Yuhao Lu et al., Ser. No. 13/523,694, filed Jun. 14, 2012;

ALKALI AND ALKALINE-EARTH ION BATTERIES WITH HEXACYANOMETALLATE CATHODE AND NON-METAL ANODE, invented by Yuhao Lu et al., Ser. No. 13/449,195, filed Apr. 17, 2012;

ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012;

BACKGROUND OF THE INVENTION

1. Field of the Invention

This invention generally relates to electrochemical storage devices and, more particularly, to a system and method for the large scale fabrication of metal cyanometallates.

2. Description of the Related Art

Large-capacity, cost-effective energy storage is the transformational technology needed to enable the large scale integration of renewable energy sources, such as wind and solar. The rechargeable battery offers efficient electrical energy storage (EES). The Li-ion battery has been the leading option based on its performance, but the source materials are too expensive for large-scale EES. Therefore, superior low cost, high-performance electrode materials are required to compete against the high cost of lithium-ion batteries, or a new system of rechargeable metal-ion batteries must be developed to replace lithium-ion batteries.

Sodium/potassium-ion batteries have recently received a great deal of attention because the natural reserves of sodium/potassium in the crust of the earth are much higher than lithium. This abundance makes possible the development of low cost batteries for EES. However, it has proved impractical to mimic the structures of $Li^+$-host compounds for $Na^+$ or $K^+$-host compounds. Sodium/potassium ions are much larger than lithium ions and they severely distort the structures of the $Li^+$-host compounds. Thus, for the development of sodium/potassium-ion batteries it is important to develop new $Na^+/K^+$-host materials with large interstitial spaces in which sodium/potassium-ions can easily and reversibly move. Transition metal cyanometallate (TMCM) materials with large interstitial spaces have been investigated as cathode materials for rechargeable lithium-ion batteries [1, 2], sodium-ion batteries [3, 4], and potassium-ion batteries [5].

With an aqueous electrolyte containing alkali-ions or ammonium-ions, copper and nickel hexacyanoferrates [(Cu, Ni)—HCFs] have demonstrated a robust cycling life with 83% capacity retention after 40,000 cycles at a charge/discharge current of 17C [6-8]. In spite of this, the materials demonstrated low capacities and energy densities because (1) only one sodium-ion can be inserted/extracted reversibly into/from Cu—HCF or Ni—HCF per formula unit and (2) these TM-HCFs electrodes must be operated below 1.23 V due to the water electrochemical window. In order to compensate for such shortcomings, manganese hexacyanoferrate (Mn—HCF) and iron hexacyanoferrate (Fe—HCF) were used as cathode materials in non-aqueous electrolyte [9, 10]. When assembled with a sodium-metal anode, Mn—HCF and Fe—HCF electrodes cycled between 2.0 volts (V) and 4.2 V delivered capacities ~110 milliamp hours per gram (mAh/g). More recently, $FeFe(CN)_6 \cdot 4H_2O$ and $Na_{0.61}Fe[Fe(CN)_6]_{0.94}$ were reported to exhibit high energy density and power density and good stability during cycling [11, 12].

Figure 1:
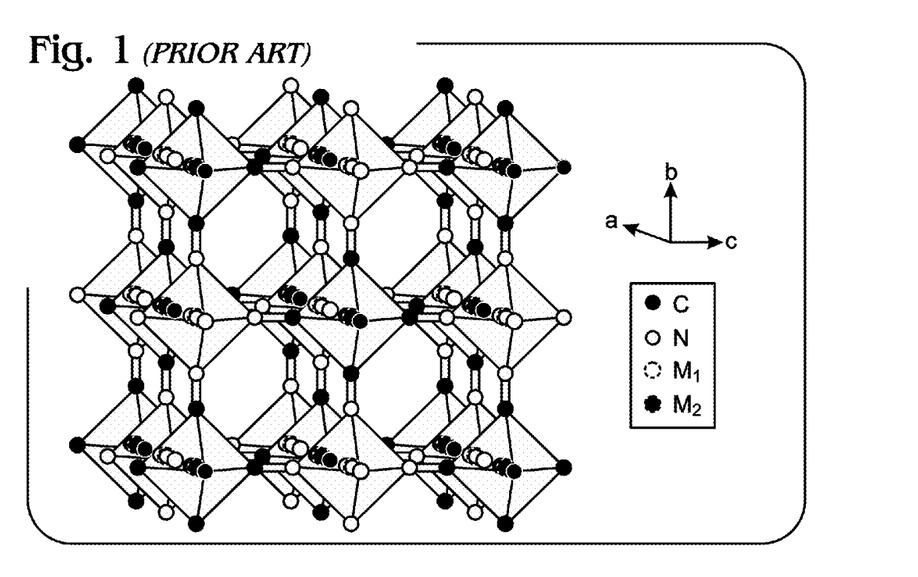
FIG. 1 is a diagram depicting the open framework of a metal cyanometallate (prior art).

FIG. 1 is a diagram depicting the open framework of a metal cyanometallate (prior art). All the compounds mentioned above can be categorized as metal cyanometallates (MCMs) with the general formula $A_xM1_mM2_n(CN)_z$ that constructs an open framework as shown. The open framework structure of the transition metal MCMs facilitates both rapid and reversible intercalation processes for alkali and alkaline ions ($A_x$). The MCMs capacity is determined by the available A-sites in the compounds into which the alkali or alkaline ions can be inserted reversibly in the range of working voltages. From the electric neutrality point of view, the valences of M1 and M2 mainly contribute to the amount of the available A-sites. For example, 2 sodium-ions can be inserted/extracted into/from $Na_2MnFe(CN)_6$ between 2-4 V vs. Na° because the valences of Mn- and Fe-ions can change between +2 and +3, which provides a theoretical capacity of 171 mAh/g. Noteworthy is the fact that as many as possible metal-ions, "A", should exist in the MCMs to deliver a high capacity in a metal-ion battery with a non-metal counter electrode. In addition, in order to neutralize charges, the transition metals should be kept at low valances.

It would be advantageous if the synthesis of MCMs could be optimized, with improvements to increase MCM particle sizes, and able to operate at a large scale for mass production.

[1] V. D. Neff, Some performance characteristics of a Prussian Blue battery, Journal of Electrochemical Society, 132 (1985) 1382-1384.

[2] N. Imanishi, T. Morikawa, J. Kondo, Y. Takeda, O. Yamamoto, N. Kinugasa, T. Yamagishi, Lithium intercalation behavior into iron cyanide complex as positive electrode of lithium secondary battery, Journal of Power Sources, 79 (1999) 215-219.

[3] Y. Lu, L. Wang, J. Cheng, J. B. Goodenough, Prussian blue: a new framework for sodium batteries, Chemistry Communication, 48(2012)6544-6546.

[4] L. Wang, Y. Lu, J. Liu, M. Xu, J. Cheng, D. Zhang, J. B. Goodenough, A superior low-cost cathode for a Na-ion battery, Angew. Chem. Int. Ed., 52(2013)1964-1967.

[5] A. Eftekhari, Potassium secondary cell based on Prussian blue cathode, J. Power Sources, 126 (2004) 221-228.

[6] C. D. Wessells, R. A. Huggins, Y. Cui, Copper hexacyanoferrate battery electrodes with long cycle life and high power, Nature Communication, 2(2011) 550.

[7] C. D. Wessells, S. V. Peddada, R. A. Huggins, Y. Cui, Nickel hexacyanoferrate nanoparticle electrodes for aqueous sodium and potassium ion batteries, Nano Letter, 11(2011) 5421-5425.

[8] C. D. Wessells, S. V. Peddada, M. T. McDowell, R. A. Huggins, Y. Cui, The effect of insertion species on nanostructured open framework hexacyanoferrate battery electrode, J. Electrochem. Soc., 159(2012) A98-A103.

[9] T. Matsuda, M. Takachi, Y. Moritomo, A sodium manganese ferrocyanide thin film for Na-ion batteries, Chemical Communications, DOI: 10.1039/C3CC38839E.

[10] S.-H. Yu, M. Shokouhimehr, T. Hyeon, Y.-E. Sung, Iron hexacyanoferrate nanoparticles as cathode materials for lithium and sodium rechargeable batteries, ECS Electrochemistry Letters, 2(2013)A39-A41.

[11] X. Wu, W. Den, J. Qian, Y. Cao, X. Ai, H. Yang, Single-crystal FeFe(CN)6 nanoparticles: a high capacity and high rate cathode for Na-ion batteries, J. Mater. Chem. A., 1(2013)10130-10134.

[12] Y.-G. Guo, Y. You, X.-L. Wu, Y.-X. Yin, High-quality Prussian blue crystals as superior cathode materials for room-temperature sodium-ion batteries, Energy & Environmental Science, (2014) DOI: 10.1039/C3EE44004D

SUMMARY OF THE INVENTION

Disclosed herein is a continuous process to synthesize metal cyanometallate (MCM) particles for use as an active material in electrochemical storage device electrodes. In the process, aging kettles are added in order to increase the particle sizes of MCM under controllable conditions. The system has two primary components, a MCM main (primary) reactor, and one to several aging kettles (secondary reactors). To modify the morphology and properties of MCM particles, additional reactors can be added into the process, for example, to support a MCM coating process. The aging kettles can provide an environment to support the growth of MCM particles, by controlling the temperature and pressure. Advantageously, after filtering and collection of the MCM particles, the solution can be reused (recycled). The final MCM particle size can be larger than 0.5 microns (um).

Accordingly, a method is presented for the large scale synthesis of metal cyanometallates. The method adds first and second precursor solutions to a main reactor, where the first precursor includes M1 metal cations. The second precursor solution includes $A_{X'}M2(CN)_{Z'}$, where M1 and M2 are from a first group of metals and A is from a second group of metals, including alkali or alkaline earth metal such as sodium or potassium, and where X' is in the range of 1 to 5 and Z' is in the range of 2 to 6. In response to stirring the first and second precursors in the main reactor, MCM particles are formed with the formula $A_XM1_NM2_M(CN)_Z \cdot d[H_2O]_{ZEO} \cdot e[H_2O]_{BND}$, in solution:

where $[H_2O]_{ZEO}$ is zeolitic water,
where $[H_2O]_{BND}$ is lattice bound water,
where X is in the range of 0.5 to 2;
where M is in the range of 0.5 to 1.5;
where N is in the range of 0.5 to 1.5;
where Z is in the range of 5 to 6;
where d is 0; and,
where e is in the range of greater than 0 and less than 8.

Some examples of M1 and M2 metals include titanium (Ti), vanadium (V), chromium (Cr), manganese (Mn), iron (Fe), cobalt (Co), nickel (Ni), copper (Cu), zinc (Zn), calcium (Ca), niobium (Nb), ruthenium (Ru), tin (Sn), indium (In), cadmium (Cd), strontium (Sr), barium (Ba), and magnesium (Mg).

The method transfers the MCM particles in solution to a secondary reactor, and in response to aging in the secondary reactor, the size of the MCM particles is grown (increased). In one aspect, there are a plurality of secondary reactors connected in parallel between the main reactor and the separation tank. The aged MCM particles in solution are then transferred to a separation tank, where the aged MCM particles are filtered from the solution and collected. The solution reclaimed from the separation tank is added back into the main reactor.

In one aspect, a third precursor is added to the main reactor, made from salts, carbonaceous materials, organics, polymers, or combinations thereof, so that the surfaces of the MCM particles become coated with the third precursor material. Alternatively, the third precursor can be added to the secondary reactor or separation tank. If the solution is primarily made up of water, then the main reactor is typically heated to a temperature in the range of 20 and 100 degrees C. If a higher boiling point solution is used, temperatures as high as 120 degrees C. may be used. The secondary reactor is typically heated to a temperature in the range of 20 to 200 degrees C., while maintaining a pressure in a range of 1 to 3 atmospheres.

Additional details of the above-described method and a system for the large scale synthesis of MCM particles are provided below.

DETAILED DESCRIPTION

Figure 2:
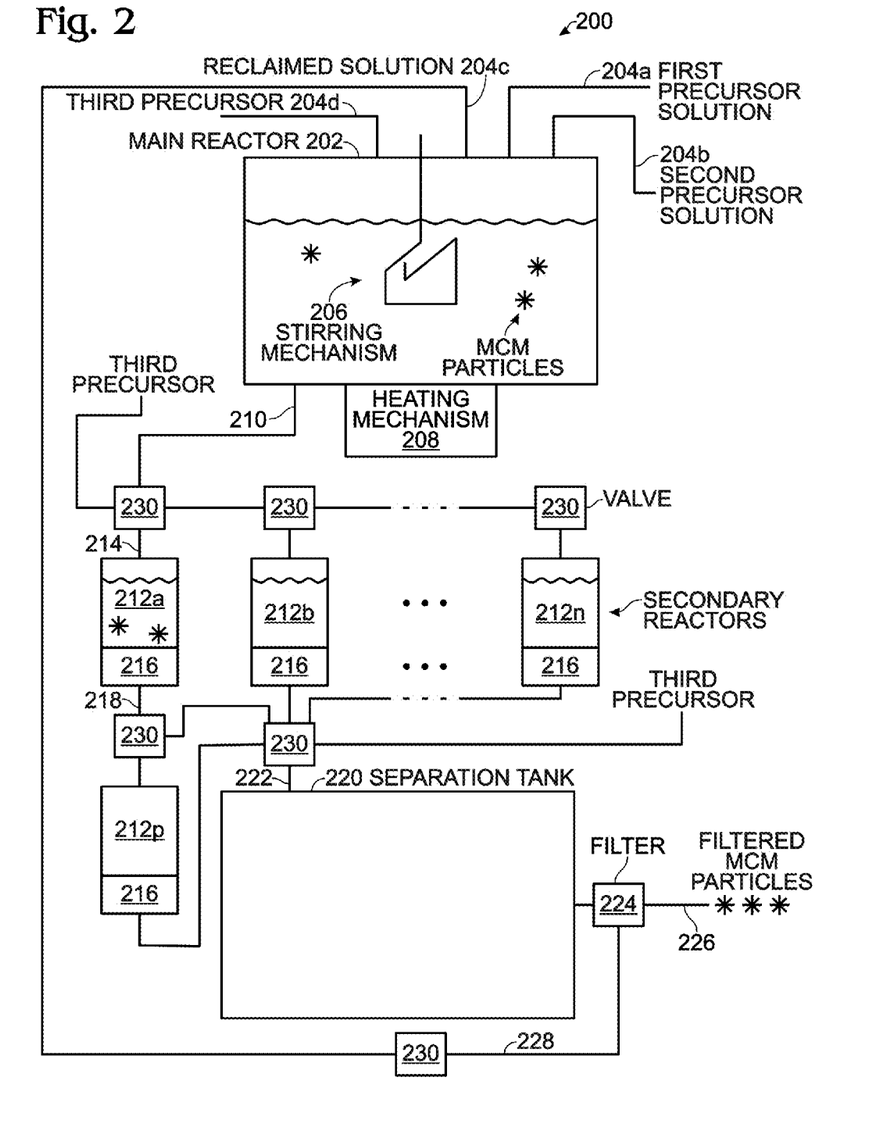
FIG. 2 is a schematic block diagram of a large scale metal cyanometallate (MCM) synthesizer.

FIG. 2 is a schematic block diagram of a large scale metal cyanometallate (MCM) synthesizer. The synthesizer 200 comprises a main reactor 202 with an inlet to accept a first precursor solution including M1 metal cations, and a second precursor solution of $A_{X'}M2(CN)_{Z'}$:

where M1 and M2 are from a first group of metals and A is from a second group of metals including alkali or alkaline earth metal such as sodium (Na) or potassium (K):

where X' is in the range of 1 to 5; and, where Z' is in the range of 2 to 6.

M1 and M2 may be same or a different metal, such as titanium (Ti), vanadium (V), chromium (Cr), manganese (Mn), iron (Fe), cobalt (Co), nickel (Ni), copper (Cu), zinc (Zn), calcium (Ca), niobium (Nb), ruthenium (Ru), tin (Sn), indium (In), cadmium (Cd), strontium (Sr), barium (Ba), or magnesium (Mg). In addition to alkali and alkaline earth metals, the A metal may also be aluminum (Al) or Zn.

The inlet also accepts reclaimed solution. For simplicity, inlet 204a is shown associated with the first precursor solution, inlet 204b is associated with the second precursor solution, and inlet 204c is associated with the reclaimed solution. However, as would be understood in the art, the system may be plumbed in a variety of ways to achieve similar results. The main reactor 202 further comprises a stirring mechanism 206 and a heating mechanism 208. The main reactor has an outlet 210 to supply a solution of MCM particles having an average first size, with the formula $A_XM1_NM2_M(CN)_Z \cdot d[H_2O]_{ZEO} \cdot e[H_2O]_{BND}$:

where $[H_2O]_{ZEO}$ is zeolitic water, where $[H_2O]_{BND}$ is lattice bound water, where X is in the range of 0.5 to 2;

where M is in the range of 0.5 to 1.5;

where N is in the range of 0.5 to 1.5;

where Z is in the range of 5 to 6;

where d is 0; and, where e is in the range of greater than 0 and less than 8.

As noted in more detail in parent application Ser. No. 14/830,838, the elimination of zeolitic water (d=0) permits the MCM particles to be used as electrode active materials in electrochemical storage devices with non-aqueous electrolytes.

A pressurized secondary reactor 212a has an inlet 214 to accept the solution of MCM particles, a heating mechanism 216, and an outlet 218 to supply aged MCM particles in solution having an average second size greater than the average first size. A separation tank 220 has an inlet 222 to accept the aged MCM particles in solution and a filter 224 to separate the aged MCM particles from the solution. An outlet supplies the filtered MCM particles and reclaimed solution. The filtered MCM particles may have a size of 0.5 microns or larger. For simplicity, outlet 226 is shown associated with filtered MCM particles and outlet 228 is shown associated with the reclaimed solution. Flow between the reactors and tank is controlled using a network of valves 230.

As shown, the system 200 may optionally comprise a plurality of pressurized secondary reactors (212a through 212n), each having an inlet connected to the main reactor output 210, and an output connected to the separation tank inlet 222. Multiple secondary reactors may be used to increase throughput. If the aging process takes longer than the main reactor process, then multiple secondary reactors are used to age different main reactor batches. In another aspect, the environmental conditions of each secondary reactor may be varied to produce MCM particles with different characteristics (e.g., particle size). In one aspect, additional ingredients may be added to some secondary reactors, but not others. In one aspect, secondary reactor 212p may be configured in series with secondary reactor 212a for multistage processing with different added ingredients or environmental conditions.

In one aspect, the main reactor 202 accepts a third precursor via inlet 204d, which is added to coat the surfaces of the MCM particles. Alternatively, the third precursor may be added to the first precursor or second precursor (or both). The third precursor includes materials such as salts, carbonaceous materials, organics, polymers, or combinations thereof. Carbonaceous materials represent the allotropes of carbon, such as graphite, hard carbon, activated carbon, carbon black and so on, that only contain carbon. The polymer may, for example, be a conductive polymer material such as polyaniline (PANI) or polypyrrole (Ppy). The conductive polymer (CP) may be in either a doped or undoped form, including combinations thereof. As used herein, a "doped" form of a CP refers to a highly conductive state for a polymer that is accessible through several methods including, but not limited to, chemical and/or electrochemical doping. For example, "doped" forms of Ppy can be formed through addition of acids to provide conductivity that is several orders of magnitude higher relative to the "undoped" species. In many cases, organic acids are employed for this purpose although many alternatives are available. Similarly, PANI in its emeraldine base form can be converted to a protonated and highly conductive "doped" species through addition of various protic acids. As well understood in the art, "organics" refer to compounds containing carbon atoms, often in combination with hydrogen, nitrogen, and/or oxygen. However, there are many other elements that may also be combined with carbon to form organics (organic compounds).

If the first and second precursor solutions primarily comprise water solution, then heating mechanism 208 heats the main reactor 202 to a temperature in the range between 20 and 100 degrees C. By comprising water it is meant that the solution mostly contains water and boils at a temperature of about 100 degrees C. Otherwise, if the first and second precursor solutions primarily comprise a high boiling point solution, then the temperature may range between 20 and 120 degrees C. Some high boiling point solutions include paraffin oil, silicone oil, ionic liquids, and gamma-butyrolactone. The high boiling point solution may be a miscible mixture of water and organics. However, not all high boiling point liquids are organic. For example, the boiling point of phosphoric acid is 158 degree C. The heating mechanism 216 heats the secondary reactor 212a to a temperature in the range of 20 to 200 degrees C., while maintaining a pressure in a range of 1 to 3 atmospheres.

In one aspect, the separation tank inlet 222 accepts the third precursor made from a material such as salts, carbonaceous materials, organics, polymer materials, and combinations thereof, and supplies filtered MCM particles at output 226 having their surfaces coated with the third precursor material. Alternatively, the third precursor may be added to a secondary reactor (e.g. secondary reactor 212a) or the main reactor 202.

The system described above synthesizes $A_X M1_n M2_m (CN)_Z \cdot d[H_2O]_{ZEO} \cdot e[H_2O]_{BND}$ in a large scale, continuous process for use as an electrochemically active electrode material in rechargeable electrochemical storage devices. The metal-ions can be from the following metals: lithium (Li), sodium (Na), potassium (K), rubidium (Rb), cesium (Cs), calcium (Ca), aluminum (Al), zinc (Zn), and/or magnesium (Mg). Some examples of metal M1 and M2 metals include titanium (Ti), vanadium (V), chromium (Cr), manganese (Mn) iron (Fe), cobalt (Co), nickel (Ni), copper (Cu), Zn, niobium (Nb), ruthenium (Ru), tin (Sn), indium (In), and cadmium (Cd). Note: Zn may be an M1 or M2 metal to constitute the MCM framework, or it can also intercalate into MCM interstitial space as an A metal.

Conventionally, a precipitation method has used to synthesize MCM materials in small scale batches. In brief, a first reactant is dissolved into the reactor, and then another reactant is added into the reactor dropwise. Accordingly, the MCM synthesis process is limited to individual batches, and thus has a relatively high cost. For the purpose of simplifying synthesis and reducing associated costs, a continuous process is disclosed herein. Moreover, several aging kettles (secondary reactors) are added into the process so that the MCM particle size and morphology can be controlled.

Figure 3:
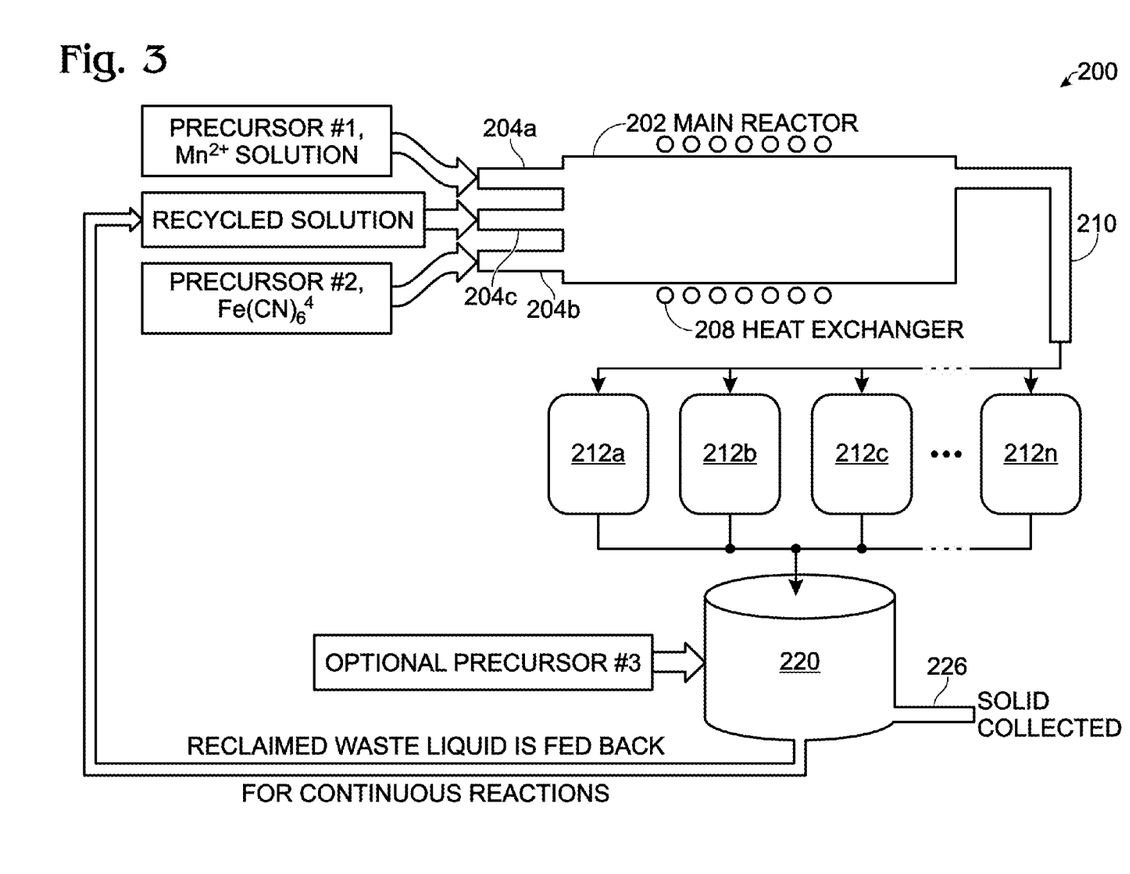
FIG. 3 is a variation of the system depicted in FIG. 2 synthesizing $Na_XMnFe(CN)_6$ particles.

FIG. 3 is a variation of the system depicted in FIG. 2 synthesizing $Na_X MnFe(CN)_6$ particles. To begin, a first precursor (precursor #1 or reactant 1) of $Mn^{2+}$ solution and a second precursor (precursor #2 or reactant 2) of $Na_4Fe(CN)_6$ solution are added into the main reactor 202. For some specific purposes, chemicals (third precursor) such as salts, organics, or polymers can be dispersed into the main reactor, or added into it with either precursor #1 or precursor #2, or both. The main reactor can be heated and kept at a temperature ranging from room temperature up to 100° C. (with water solution) or higher (with high boiling point solutions). Under stirring, precursors #1 and #2 react to form $Na_X MnFe(CN)_6$ particles in the main reactor.

To promote particle growth, the solution can be maintained for several hours in a so-called aging step. Since the synthesis is a continuous process, it is not economical to perform the aging step in the main reactor. Thus, one or more aging kettles (secondary reactors) are added following the main reactor. The number of aging kettles is determined by the product formation rate in the main reactor and the required aging time. The $Na_X MnFe(CN)_6$ particles are transferred to the secondary reactors and continue to grow under controlled temperature and pressure conditions. After the $Na_X MnFe(CN)_6$ particles reach the desired size, the solution containing $Na_X MnFe(CN)_6$ particles is filtered to isolate the particles from the solution. After a washing (optional) and drying process, the $Na_X MnFe(CN)_6$ particles are ready for use. To reduce the synthesis cost and minimize environmental concerns, the filtered solution can be recycled and added back into the main reactor with either precursor #1 or precursor #2, or both.

In order to improve the performance of certain MCM materials, they may be prepared as a composite with carbon or other conductive materials. In this case, carbonaceous or other conductive materials can be added into the main reactors. To post-treat the synthesized MCM particles, optional reactors can be added before filtration (e.g., secondary reactor 212a of FIG. 2), or the addition of conductive materials may be included in post-treatment (e.g., in the separation tank), so that the MCM particles become coated with conductive materials such as carbon and polymers through precursor #3.

Figure 4:
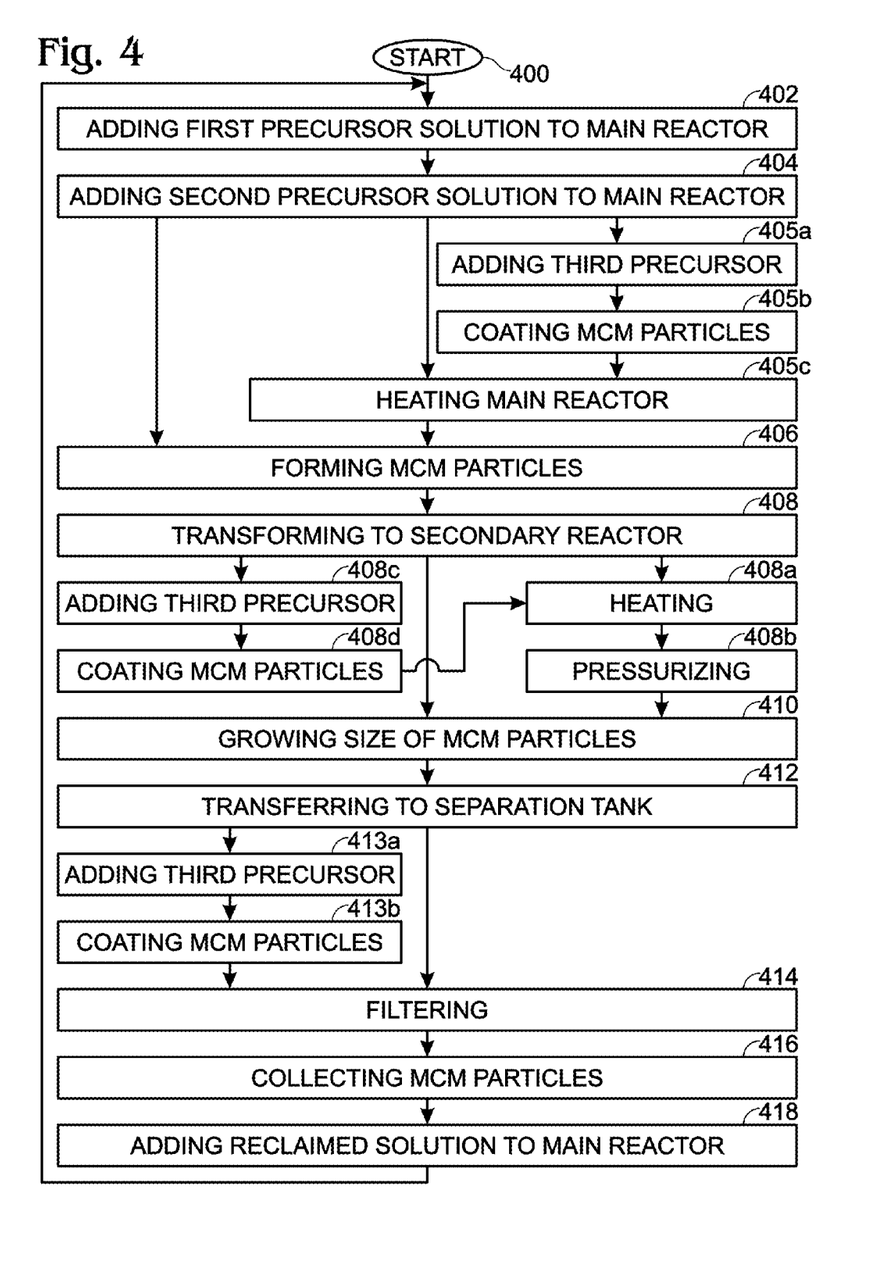
FIG. 4 is a flowchart illustrating a method for large scale synthesis of metal cyanometallates.

FIG. 4 is a flowchart illustrating a method for large scale synthesis of metal cyanometallates. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 400.

Step 402 adds a first precursor solution to a main reactor, where the first precursor includes M1 metal cations. Step 404 adds a second precursor solution of $A_{X'} M2(CN)_{Z'}$ to the main reactor, where M1 and M2 are from a first group of metals and A is from a second group of metals including alkali or alkaline earth metal such as Na or K;

where X' is in the range of 1 to 5;

where Z' is in the range of 2 to 6;

Note, Step 402 and 404 need not be performed in any particular order. As noted above, M1 and M2 may be the same or a different metal, examples of which include Ti, V, Cr, Mn, Fe, Co, Ni, Cu, Zn, Ca, Nb, Ru, Sn, In, Cd, Sr, Ba, and Mg. The A metal may be Li, Na, K, Rb, Cs, Ca, Mg, Al, or Zn.

In response to stirring the first and second precursors in the main reactor, Step 406 forms MCM particles, with the formula $A_X M1_N M2_M (CN)_Z \cdot d[H_2O]_{ZEO} \cdot e[H_2O]_{BND}$, in solution:

where $[H_2O]_{ZEO}$ is zeolitic water, where $[H_2O]_{BND}$ is lattice bound water, where X is in the range of 0.5 to 2;

where M is in the range of 0.5 to 1.5;
where N is in the range of 0.5 to 1.5;
where Z is in the range of 5 to 6;
where d is 0; and,
where e is in the range of greater than 0 and less than 8.

Step 408 transfers the MCM particles in solution to a secondary reactor. In response to aging in the secondary reactor, Step 410 grows (increases) the size of the MCM particles. Step 412 transfers the aged MCM particles in solution to a separation tank. Step 414 filters the aged MCM particles from the solution. Step 416 collects the filtered MCM particles, and Step 418 adds solution reclaimed from the separation tank back into the main reactor. The filtered MCM particles collected in Step 416 may have a size of 0.5 microns or larger.

In one aspect, transferring the MCM particles in solution to the secondary reactor in Step 408 includes transferring the MCM particles in solution to a plurality of secondary reactors connected in parallel between the main reactor and the separation tank. In another aspect, Step 408 includes substeps. Step 408a heats the secondary reactor to a temperature in the range of 20 to 200 degrees C., and Step 408b maintains a pressure in a range of 1 to 3 atmospheres.

In one aspect, Step 405a adds a third precursor to the main reactor such as salts, carbonaceous materials, organics, polymers, or combinations thereof. Step 405b coats the MCM particle surfaces with third precursor material. If Steps 402 and 404 add the first and second precursors to the main reactor in a water solution, Step 405b heats the main reactor to a temperature in the range between 20 and 100 degrees C. Otherwise, if the first and second precursors to the main reactor in a high boiling point solution, then Step 405c may heat the main reactor to a temperature in the range of 20 to 120 degrees C.

In one variation, Step 413a adds a third precursor to the separation tank made from a material such as carbonaceous materials, organics, polymer materials, and combinations thereof. Then, Step 413b coats the aged MCM particle surfaces with the third precursor material. Alternatively, Step 408c adds the third precursor to the secondary reactor and Step 408d coats the MCM particle surfaces with the third precursor material.

Figure 5A:
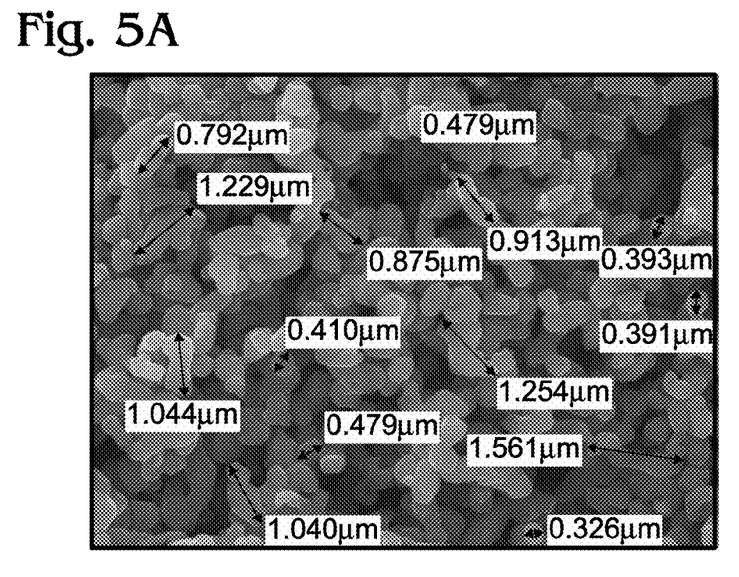
FIGS. 5A through 5C are scanning electron microscope (SEM) images that depict steps in a MCM aging process to promote particle growth.
Figure 5B:
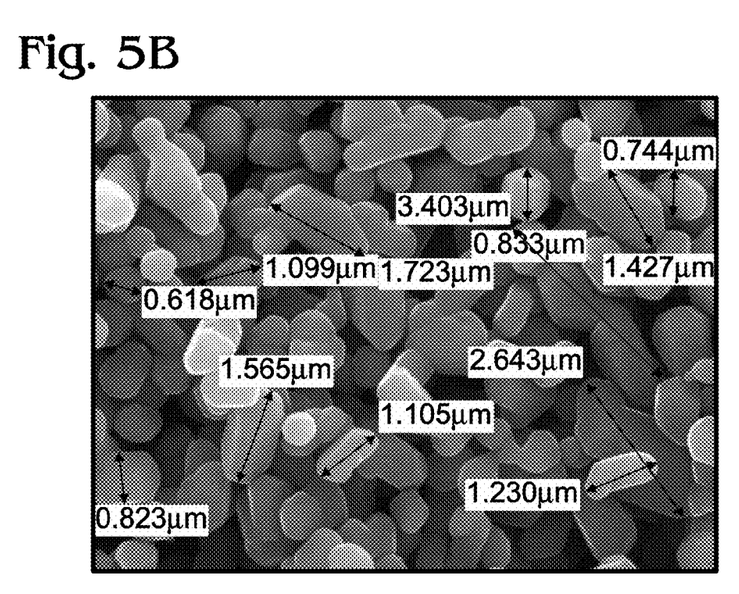
Figure 5C:
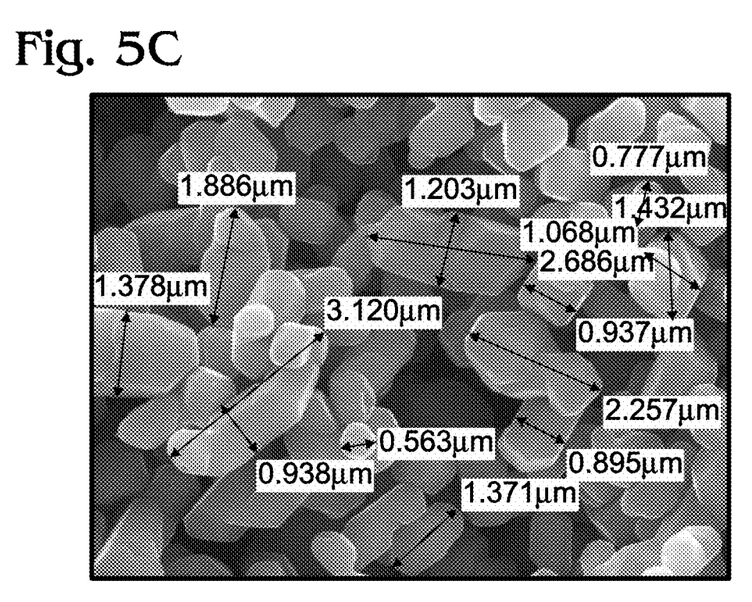

FIGS. 5A through 5C are scanning electron microscope (SEM) images that depict steps in a MCM aging process to promote particle growth. FIG. 5A shows MCM particles synthesized using a 3 hours interval in the main reactor at a temperature of 90 degrees C. At the same level of magnification it can be seen that particle size is increased with an additional 3 hours in a secondary reactor at 125 degrees C. due to the aging process (FIG. 5B). The particle size increases even further after 6 hours in a secondary reactor at 125 degrees C. (FIG. 5C).

A system and method have been provided for the large scale synthesis of MCM particles. Examples of chemical elements, process steps, and hardware units have been presented to illustrate the invention. However, the invention is not limited to merely these examples. Other variations and embodiments of the invention will occur to those skilled in the art.

We claim:

1. A method for large scale synthesis of metal cyanometallates (MCMs), the method comprising:
adding a first precursor solution to a main reactor, where the first precursor includes M1 metal cations;
adding a second precursor solution of $A_{X'}M2(CN)_{Z'}$ to the main reactor,
where M1 and M2 are from a first group of metals and A is from a second group of metals;
where X' is in the range of 1 to 5;
where Z' is in the range of 2 to 6;
in response to stirring the first and second precursors in the main reactor, forming MCM particles, with the formula $A_XM1_NM2_M(CN)_Z \cdot d[H_2O]_{ZEO} \cdot e[H_2O]_{BND}$, in solution:
where $[H_2O]_{ZEO}$ is zeolitic water,
where $[H_2O]_{BND}$ is lattice bound water,
where x is in the range of 0.5 to 2;
where m is in the range of 0.5 to 1.5;
where N is in the range of 0.5 to 1.5;
where z is in the range of 5 to 6;
where d is 0;
where e is in the range of greater than 0 and less than 8;
transferring the MCM particles in solution to a secondary reactor;
in response to aging in the secondary reactor, growing (increasing) the size of the MCM particles;
transferring the aged MCM particles in solution to a separation tank;
filtering the aged MCM particles from the solution;
collecting the filtered MCM particles; and,
adding solution reclaimed from the separation tank back into the main reactor.

2. The method of claim 1 wherein transferring the MCM particles in solution to the secondary reactor includes transferring the MCM particles in solution to a plurality of secondary reactors connected in parallel between the main reactor and the separation tank.

3. The method of claim 1 wherein collecting the filtered MCM particles includes collecting MCM particles having a size of 0.5 microns or larger.

4. The method of claim 1 further comprising:
adding a third precursor selected from the group consisting of salts, carbonaceous materials, organics, polymers, or combinations thereof, into a vessel selected from the group consisting of the main reactor, the secondary reactor, the separation tank, or combinations thereof; and,
coating MCM particle surfaces with the third precursor material.

5. The method of claim 1 wherein adding the first and second precursors to the main reactor includes adding the first and second precursors in a water solution; and,
the method further comprising:
heating the main reactor to a temperature in a range between 20 and 100 degrees C.

6. The method of claim 1 wherein adding the first and second precursors to the main reactor includes adding the first and second precursors in a high boiling point solution; and,
the method further comprising:
heating the main reactor to a temperature in a range of 20 to 120 degrees C.

7. The method of claim 1 wherein transferring the MCM particles in solution to the secondary reactor includes:
heating the secondary reactor to a temperature in a range of 20 to 200 degrees C.; and,
maintaining a pressure in a range of 1 to 3 atmospheres.

8. The method of claim 1 where A is selected from the group consisting of lithium, (Li), sodium (Na), potassium (K), rubidium (Rb), cesium (Cs), calcium (Ca), magnesium (Mg), aluminum (Al), and zinc (Zn).

9. The method of claim 1 wherein M1 and M2 are independently selected from the group consisting of titanium (Ti), vanadium (V), chromium (Cr), manganese (Mn), iron (Fe), cobalt (Co), nickel (Ni), copper (Cu), Zn, calcium (Ca), niobium (Nb), ruthenium (Ru), tin (Sn), indium (In), cadmium (Cd), strontium (Sr), barium (Ba), and magnesium (Mg).

10. A large scale metal cyanometallate (MCM) synthesizer, the synthesizer comprising:
a main reactor comprising:
an inlet configured to accept:
a first precursor solution including M1 metal cations;
a second precursor solution of $A_{X'}M2(CN)_{Z'}$, where M1 and M2 are from a first group of metals and A is from a second group of metals, where X' is in the range of 1 to 5, and where Z' is in the range of 2 to 6;
a reclaimed solution;
a stirring mechanism;
a heating mechanism;
an outlet to supply a solution of MCM particles having an average first size, with the formula $A_X M1_N M2_M (CN)_Z \cdot d[H_2O]_{ZEO} \cdot e[H_2O]_{BND}$:
where $[H_2O]_{ZEO}$ is zeolitic water,
where $[H_2O]_{BND}$ is lattice bound water,
where X is in the range of 0.5 to 2;
where M is in the range of 0.5 to 1.5;
where N is in the range of 0.5 to 1.5;
where Z is in the range of 5 to 6;
where d is 0;
where e is in the range of greater than 0 and less than 8;
a pressurized secondary reactor having an inlet to accept the solution of MCM particles, a heating mechanism, and an outlet to supply aged MCM particles in solution having an average second size greater than the average first size; and,
a separation tank having an inlet to accept the aged MCM particles in solution, a filter to separate the aged MCM particles from the solution, and an outlet to supply the filtered MCM particles and reclaimed solution.

11. The synthesizer of claim 10 further comprising:
a plurality of pressurized secondary reactors, each having an inlet connected to the main reactor output, and an output connected to the separation tank inlet.

12. The synthesizer of claim 10 wherein the separation tank first outlet supplies filtered MCM particles having a size of 0.5 microns or larger.

13. The synthesizer of claim 10 wherein the main reactor accepts a third precursor selected from the group consisting of salts, carbonaceous materials, organics, polymers, or combinations thereof; and,
wherein the main reactor outlet supplies MCM particle surfaces coated with the third precursor material.

14. The synthesizer of claim 10 wherein the first and second precursors solutions comprise water; and
wherein heating mechanism heats the main reactor to a temperature in a range between 20 and 100 degrees C.

15. The synthesizer of claim 10 wherein the first and second precursors solutions comprise a high boiling point solution; and
wherein heating mechanism heats the main reactor to a temperature in a range between 20 and 120 degrees C.

16. The synthesizer of claim 10 wherein the heating mechanism heats the secondary reactor to a temperature in a range of 20 to 200 degrees C., while maintaining a pressure in a range of 1 to 3 atmospheres.

17. The synthesizer of claim 10 wherein the separation tank inlet accepts a third precursor made from a material selected from the group consisting of salts, carbonaceous materials, organics, polymer materials, and combinations thereof, and,
wherein the separation tank outlet supplies filtered MCM particle surfaces coated with the third precursor material.

18. The synthesizer of claim 10 wherein the secondary reactor accepts a third precursor made from a material selected from the group consisting of salts, carbonaceous materials, organics, polymer materials, and combinations thereof, and,
wherein the secondary reactor outlet supplies aged MCM particle surfaces coated with the third precursor material.

19. The synthesizer of claim 10 where A is selected from the group consisting of lithium, (Li), sodium (Na), potassium (K), rubidium (Rb), cesium (Cs), calcium (Ca), magnesium (Mg), aluminum (Al), and zinc (Zn).

20. The synthesizer of claim 10 wherein M1 and M2 are independently selected from the group consisting of titanium (Ti), vanadium (V), chromium (Cr), manganese (Mn), iron (Fe), cobalt (Co), nickel (Ni), copper (Cu), Zn, calcium (Ca), niobium (Nb), ruthenium (Ru), tin (Sn), indium (In), cadmium (Cd), strontium (Sr), barium (Ba), and magnesium (Mg).

* * * * *